(12) United States Patent
Matute

(10) Patent No.: US 10,256,995 B1
(45) Date of Patent: Apr. 9, 2019

(54) DYNAMIC POWER ADJUSTMENT OF WIRELESS LIGHTING SYSTEM GATEWAY

(71) Applicant: Cooper Technologies Company, Hoston, TX (US)

(72) Inventor: Leonardo Enrique Matute, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/628,457

(22) Filed: Jun. 20, 2017

Related U.S. Application Data

(60) Provisional application No. 62/352,272, filed on Jun. 20, 2016.

(51) Int. Cl.
*H05B 37/02* (2006.01)
*H04L 12/66* (2006.01)
*H04L 12/28* (2006.01)

(52) U.S. Cl.
CPC .......... *H04L 12/66* (2013.01); *H04L 12/2803* (2013.01); *H05B 37/0272* (2013.01)

(58) Field of Classification Search
CPC .. H04L 12/2803; H04L 12/66; H05B 37/0272
See application file for complete search history.

(56) References Cited

U.S. PATENT DOCUMENTS

| | | | | |
|---|---|---|---|---|
| 9,357,621 B2* | 5/2016 | Lim | ....................... | H05B 37/02 |
| 9,538,625 B2* | 1/2017 | Szabados | ........... | H05B 37/0254 |
| 9,554,367 B1* | 1/2017 | Liu | ........................ | H04W 36/16 |
| 2003/0043436 A1* | 3/2003 | Nagai | ................ | H04B 10/1143 |
| | | | | 398/126 |
| 2004/0242257 A1* | 12/2004 | Valkealahti | ........... | H04W 16/06 |
| | | | | 455/522 |
| 2008/0218334 A1* | 9/2008 | Pitchers | .............. | H04L 41/0893 |
| | | | | 340/539.1 |
| 2009/0109889 A1* | 4/2009 | Budampati | ......... | H04L 12/1895 |
| | | | | 370/312 |
| 2014/0009110 A1* | 1/2014 | Lee | ......................... | H02J 7/025 |
| | | | | 320/108 |
| 2015/0108901 A1* | 4/2015 | Greene | .............. | H05B 37/0218 |
| | | | | 315/149 |

* cited by examiner

*Primary Examiner* — Alexander H Taningco
*Assistant Examiner* — Kurtis R Bahr
(74) *Attorney, Agent, or Firm* — King & Spalding LLP

(57) ABSTRACT

A gateway device of a wireless lighting system includes a transmitter configured to transmit network information wirelessly at a first power level and pair with one or more wireless nodes based on the network information transmitted by the gateway device at the first power level. The transmitter is further configured to transmit the network information wirelessly at a second power level after transmitting the network information wirelessly at the first power level, where the second power level is greater than the first power level.

19 Claims, 3 Drawing Sheets

US 10,256,995 B1

DYNAMIC POWER ADJUSTMENT OF WIRELESS LIGHTING SYSTEM GATEWAY

CROSS REFERENCE TO RELATED APPLICATIONS

The present application claims priority under 35 U.S.C. Section 119(e) to U.S. Provisional Patent Application No. 62/352,272, filed Jun. 20, 2016 and titled "Dynamic Power Adjustment Of Wireless Lighting System Gateway," the entire content of which is incorporated herein by reference.

TECHNICAL FIELD

The present disclosure relates generally to lighting solutions, and more particularly to managing the establishment of wireless communications in a wireless lighting system based on dynamic power control.

BACKGROUND

A wireless lighting system typically includes a gateway device and multiple lighting devices that can wirelessly communicate with the gateway device. After a power outage, a reset, or during a commissioning process, all lighting devices within a range of the gateway device attempt to establish wireless communications (i.e., pair) with the gateway device and to wirelessly communicate with the gateway device. The large number of attempts by the multiple lighting devices can cause network overload, package collisions, and other network issues that can result in dropped messages or even network failure. Thus, a solution that facilitates orderly establishment of wireless communications between the gateway device and the wireless lighting devices of the system is desirable.

SUMMARY

The present disclosure relates generally to lighting solutions, and more particularly to managing the establishment of wireless communications in a wireless lighting system based on dynamic power control. In an example embodiment, a gateway device of a wireless lighting system includes a transmitter configured to transmit network information wirelessly at a first power level and pair with one or more lighting devices based on the network information transmitted by the gateway device at the first power level. The transmitter is further configured to transmit the network information wirelessly at a second power level after transmitting the network information wirelessly at the first power level, where the second power level is greater than the first power level.

In another example embodiment, a wireless lighting system includes a gateway device configured to wirelessly transmit network information at a first power level and to wirelessly transmit the network information at a second power level after transmitting the network information at the first power level. The wireless lighting system further includes a first wireless node located within a first distance from the gateway device. The wireless lighting system also includes a second wireless node located at a second distance from the gateway device that is longer than the first distance. The first wireless node pairs with the gateway device based on the network information transmitted at the first power level, and the second wireless node pairs with the gateway device based on the network information transmitted at the second power level. The second wireless node is unable to pair with the gateway device based on the network information transmitted at the first power level.

In another example embodiment, a method of establishing wireless communications between a gateway device and lighting devices of a wireless lighting system includes transmitting wirelessly, by a gateway device, network information at a first power level. The method further includes pairing, by the gateway device, with one or more first lighting devices based on the network information transmitted at the first power level, and transmitting wirelessly, by the gateway device, the network information at a second power level after transmitting the network information at the first power level, where the second power level is greater than the first power level. The method also includes pairing, by the gateway device, with one or more second lighting devices based on the network information transmitted at the second power level, where the first power level is inadequate for the gateway device to pair with the one or more second lighting devices.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein.

Figure 1:
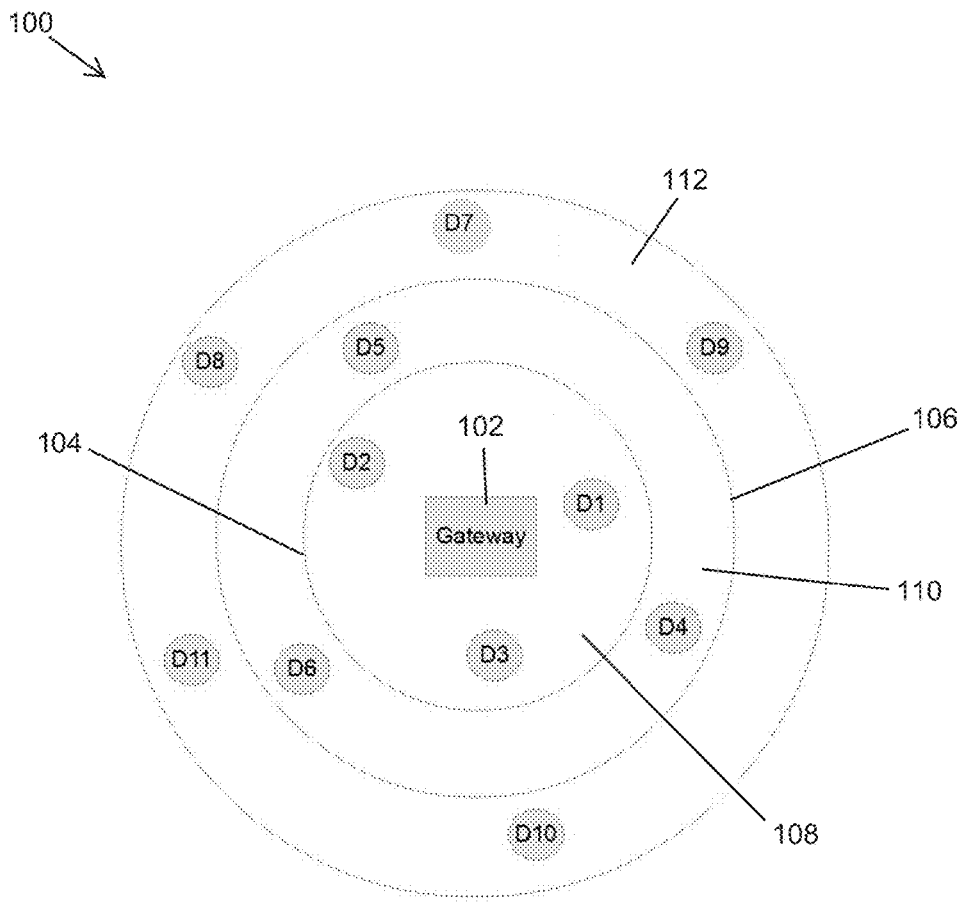
FIG. 1 illustrates a wireless lighting system with dynamic power adjustment according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals that are used with respect to different drawings designate like or corresponding, but not necessarily identical elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

At power up and reset of a gateway device of a wireless lighting network, in order to avoid every Wireless Node within range of the gateway device from interacting with the gateway to join the wireless network at the same time, the gateway device can transmit network signals in (RF) power level increasing from low to high. Having different power levels can momentarily reduce the range of the signals transmitted by the gateway device such that only devices very close to the gateway device are able to communicate and join the wireless network (i.e., pair with the gateway device) at a low power level. As the power level of the wireless signals from the gateway device increases, the range of the wireless signals increases proportionally, thereby enabling more and more lighting devices to join the wireless network, for example, until all devices join the network.

FIG. 1 illustrates a wireless lighting system 100 with dynamic power adjustment according to an example embodiment. As illustrated in FIG. 1, the wireless lighting system 100 includes a gateway device 102 and wireless nodes D1-D11. For example, each of the wireless nodeswireless nodes D1-D11 may be a router, a repeater, a light fixture, a switch, switchpacks, a dimmer, a wall station, a power receptacle, or another wireless node as may be contemplated by those of ordinary skill in the art with the benefit of this disclosure. The wireless nodes D1-D11 are capable of wireless communication with the gateway device 102. To illustrate, the gateway device 102 and the wireless nodes D1-D11 may each include a transmitter and/or a receiver to transmit and/or receive wireless signals, for example, based on one or more wireless communication standards such as Wi-Fi and ZigBee. For example, once the wireless nodes D1-D11 pair with the gateway device 102, one or more the wireless nodes D1-D11 may control (e.g., turn on or off) another one of the wireless nodes D1-D11 by wirelessly communicating with the gateway device 102.

Different power zones around the gateway device 102 that are delineated by illustrative boundary lines 104, 106, which are not necessarily physical boundary lines, are shown in FIG. 1. The wireless nodes D1-D3 are in a first power zone 108 marked by the boundary line 104. The wireless nodes D4-D6 are in a second power zone 110 that is between the boundary lines 104 and 106. The wireless nodes D7-D11 are in a third power zone 112 that is outside of the boundary line 106. The wireless nodes D1-D3 are located within a first distance (e.g., radius) from the gateway device 102, and the wireless nodes D4-D6 are located at distances from the gateway device 102 that are farther than the locations of the wireless nodes D1-D3 from the gateway device 102. The wireless nodes D7-D11 are located at distances from the gateway device 102 that are farther than the locations of the wireless nodes D4-D6 from the gateway device 102.

At power up (e.g., initial power up, during commissioning, etc.) and under some operations such as following a reset of the gateway device 102, the gateway device 102 can transmit outgoing wireless signals carrying network information at a first power level followed by transmitting the outgoing wireless signals carrying the network information at a second power level. That is, the gateway device 102 can transmit network information at a first power level and can transmit the network information at a second power level after completing the transmission of the network information at the first power level. For example, the network information may include information that enables the wireless nodes D1-D11 to pair with the gateway device 102, thus enabling the wireless nodes D1-D11 to join the wireless network of the wireless lighting system 100. The outgoing wireless signals transmitted by the gateway device 102 may also include other information/messages, such as, lighting device control messages.

As illustrated in FIG. 1, the wireless nodes D1-D3 are located in the power zone 108 closer to the gateway device 102 than the wireless nodes D4-D11 that are in power zones 110, 112. When the gateway device 102 transmits the outgoing wireless signals at a first power level, the outgoing wireless signals may be successfully received (for example, for successful decoding, etc.) by the wireless nodes D1-D3, but may be too weak for successful reception by the wireless nodes D4-D11 because of the greater distance of the wireless nodes D4-D11 from the gateway device 102 as compared to the wireless nodes D1-D3. Thus, during the transmission of the outgoing wireless signals by the gateway device 102 at the first power level, the wireless nodes D1-D3 may be able to join the wireless network (i.e., pair with the gateway device 102) while the wireless nodes D4-D11 remain unpaired with the gateway device 102.

In some example embodiments, the gateway device 102 may transmit the outgoing wireless signals at the first power level until there are no wireless nodes attempting to pair with the gateway device 102 based on the network information/messages in the outgoing wireless signals transmitted by the gateway device 102 at the first power level. Because the first power level is intended to enable only wireless nodes that are in the power zone 108 to pair with the gateway device 102, the gateway device 102 transmits the outgoing wireless signals at the first power level until the wireless nodes D1-D3 are paired with the gateway device 102 or until none of the wireless nodes D1-D3 are attempting to pair with the gateway device 102. The gateway device 102 continues to transmit the outgoing wireless signals at the first power level as long as the gateway device 102 detects attempts by wireless nodes to pair with the gateway device 102 based on the network information/messages included in the outgoing wireless signals transmitted at the first power level.

After transmitting the outgoing wireless signals at the first power level for a time duration, the gateway device 102 may start transmitting the outgoing wireless signals at a second power level that is higher than the first power level. To illustrate, when the gateway device 102 transmits the outgoing wireless signals at the second power level, the outgoing wireless signals may be successfully received (for example, for successful decoding, etc.) by the wireless nodes D1-D6, but may be too weak for successful reception by the wireless nodes D7-D11 because of the longer distance of the wireless nodes D7-D11 from the gateway device 102 as compared to the wireless nodes D1-D6. Thus, during the transmission of the outgoing wireless signals by the gateway device 102 at the second power level, the wireless nodes D4-D6 may be able to join the wireless network (i.e., pair with the gateway device 102) while the wireless nodes D7-D11 remain unpaired with the gateway device 102. Because the wireless nodes D1-D3 had already paired with the gateway device 102 during the transmission of the outgoing wireless signals at the first power level, the wireless nodes D1-D3 are not in contention to pair with the gateway device 102 during the transmission of the outgoing wireless signals by the gateway device 102 at the second power level.

In some example embodiments, the gateway device 102 may transmit the outgoing wireless signals at the second power level until wireless nodes are no longer attempting to pair with the gateway device 102 based on the outgoing wireless signals transmitted by the gateway device 102 at the second power level. Because the second power level is high enough to enable only wireless nodes that are in the power zones 108, 110 to pair with the gateway device 102, the gateway device 102 transmits the outgoing wireless signals at the second power level until the wireless nodes D1-D6 are paired with the gateway device 102 or until none of the wireless nodes D1-D6 are attempting to pair with the gateway device 102. The gateway device 102 continues to transmit the outgoing wireless signals at the second power level as long as the gateway device 102 detects attempts by wireless nodes to pair with the gateway device 102 based on the outgoing wireless signals transmitted at the second power level.

After transmitting the outgoing wireless signals at the second power level for a time duration, the gateway device 102 may start transmitting the outgoing wireless signals at a third power level that is higher than the second power level. In some example embodiments, the third power level may be the maximum power level at which the gateway device 102 is designed to transmit the outgoing wireless signals. To illustrate, when the gateway device 102 transmits the outgoing wireless signals at the third power level, the outgoing wireless signals may be successfully received (for example, for successful decoding, etc.) by the wireless nodes D1-D11, but may be too weak for successful reception by wireless nodes that may be beyond the power zone 112 because of the increased distance from the gateway device 102 as compared to the wireless nodes D1-D11. Thus, during the transmission of the outgoing wireless signals by the gateway device 102 at the third power level, the wireless nodes D7-D11 may be able to join the wireless network (i.e., pair with the gateway device 102). Because the wireless nodes D1-D6 had already paired with the gateway device 102 during the transmission of the outgoing wireless signals at the first power level and during the transmission of the outgoing wireless signals at the second power level, the wireless nodes D1-D6 are not in contention to pair with the gateway device 102 during the transmission of the outgoing wireless signals by the gateway device 102 at the third power level.

Thus, by dynamically adjusting the power level of the outgoing wireless signals transmitted by the gateway device 102 and that enable the wireless nodes Dl-D11 to pair with the gateway device 102 (i.e., join the wireless lighting network), the pairing of the wireless nodes D1-D11 can be staggered, resulting in reduced network overload, signal collisions, and other network issues following power up of the gateway device and/or the wireless nodes D1-D11 and during or following operations such as reset of the gateway device 102 and/or the wireless nodes Dl-D11.

In some example embodiments, the system 100 may have fewer or more than eleven wireless nodes. Although a particular number of wireless nodes are shown in each power zone, in alternative embodiments, the power zones may include fewer or more wireless nodes than shown. The wireless nodes may also be located at different locations and/or distances from the gateway device 102 than shown without departing from the scope of this disclosure. In some alternative embodiments, the gateway device 102 may transmit the outgoing wireless signals at more or fewer than the three power levels described above without departing from the scope of this disclosure. For example, the system 100 may include more or fewer than three power zones. The boundary lines represent the farthest distance from the gateway device 102 that a wireless node can successfully receive and process the outgoing wireless signals transmitted by the gateway device 102. Thus, the power zones may be larger, smaller, different shape than shown in FIG. 1 without departing from the scope of this disclosure.

Figure 2:
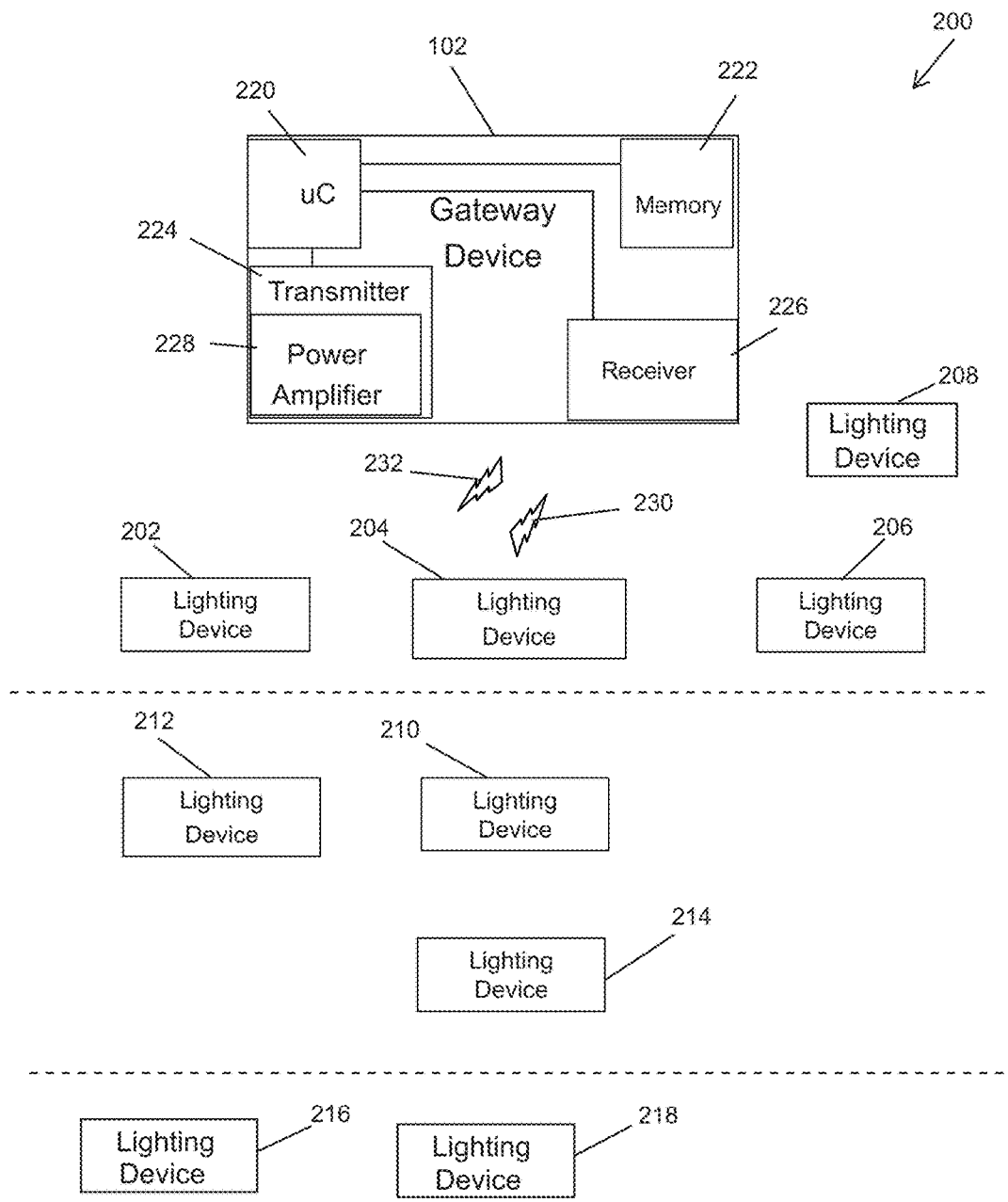
FIG. 2 illustrates a wireless lighting system with dynamic power adjustment according to another example embodiment.

FIG. 2 illustrates a wireless lighting system 200 with dynamic power adjustment according to another example embodiment. As illustrated in FIG. 2, the wireless lighting system 200 includes a gateway device 102 and wireless nodes 202-218 that are similar to the wireless nodes D1-D11 of FIG. 1. For example, each of the wireless nodes 202-218 may be a router, a repeater, a light fixture, a switch, switchpacks, a dimmer, a wall station, a power receptacle, or another wireless node that includes a transmitter and/or a receiver to transmit and/or receive wireless signals to communicate with the gateway device 102, for example, based on one or more wireless communication standards such as Wi-Fi and ZigBee. For example, the wireless nodes 202-218 may transmit wireless signals 232 that are received by a receiver 226 of the gateway device 102. As illustrated in FIG. 2, the wireless nodes 202-208 are located closer to the gateway device 102 than the wireless nodes 208-218, and the wireless nodes 210-214 are located closer to the gateway device 102 than the wireless nodes 216, 218.

The gateway device 102 is designed to dynamically change the power level at which the gateway device 102 transmits outgoing wireless signals 230 carrying network information. For example, the gateway device 102 may include a controller 220, a memory 222, a transmitter 224, and the receiver 226. The transmitter 224 may include a power amplifier 228 that can be controlled to change the power level of the outgoing wireless signals 230 transmitted by the gateway device 102. For example, the controller 220 may be configured to control the power amplifier 228 to control the power level of the outgoing wireless signals 230. To illustrate, the controller 220 may control the power amplifier 228 based on power setting information stored in the memory 222. As a non-limiting example, the memory 222 may contain information indicating that, at power up, reset, or in response to a particular user input, the power level should be set to, for example, 10% of the maximum power for a first duration of transmissions of the outgoing wireless signals, 40% of the maximum power for a second duration of transmissions of the outgoing wireless signals, 80% of the maximum power for a third duration of transmissions of the outgoing wireless signals, and finally the maximum power for subsequent transmissions of the outgoing wireless signals.

In some example embodiments, the gateway device 102 may have information about the distribution of the wireless nodes 202-218, for example, relative to the gateway device 102. For example, the gateway device 102 may have the distribution information based on a user input or from prior provisioning/commissioning of the system 200. The gateway device 102 may set the power levels of the outgoing wireless signals 230 based on the distribution of the wireless nodes 202-218 to minimize network collision and other network issues at power up, reset, or other similar operations. For example, if the number of wireless nodes that are close to the gateway device 102 is relatively large, the gateway device 102 may first transmit the outgoing wireless signals 230 at a relatively low power level (e.g., 5% or 10% of maximum power) to restrict the number of wireless nodes among the wireless nodes 202-218 that can successfully receive and process the outgoing wireless signals 230, thus minimizing network issues that many result from too many of the wireless nodes 202-218 simultaneously attempting to pair with the gateway device 102. For example, once the wireless nodes 202-208 successfully pair with the gateway device 102 and/or after a timeout period, the gateway device 102 may transmit the outgoing wireless signals 230 at a second power level (e.g., 50% of maximum power) that enables the wireless nodes 210-214 to pair with the gateway device 102 but that is too weak for the wireless nodes 216, 218 to pair with the gateway device 102. The gateway device 102 may subsequently transmit the outgoing wireless signals 230 at a third power level (e.g., 80% or 100% of maximum power) that enables the wireless nodes 216, 218 to pair with the gateway device 102. In some example embodiments, the power setting of the power amplifier 228 and thus, the power level of outgoing wireless signals 230 may be set based on a maximum number of wireless nodes that should be allowed to pair with the gateway device 102 at a particular power level setting.

In some example embodiments, the system 200 may have fewer or more wireless nodes than shown, and the number and locations the wireless nodes may be different than shown without departing from the scope of this disclosure. In some example embodiments, the gateway device 102 may dynamically change the power levels to two or more power sequential levels without departing from the scope of this disclosure. For example, the wireless nodes 216, 218 may first transmit the outgoing wireless signals 230 at a first power level (e.g., 30% of maximum power) followed by transmitting the outgoing wireless signals 230 at or close to the maximum power level. Although the gateway device 102 is shown to include particular connections and components, in some alternative embodiments, the gateway device 102 may include other components and connections without departing from the scope of this disclosure. In some alternative embodiments, the power amplifier 228 may be controlled via a different input and/or from a different component than the controller 220 without departing from the scope of this disclosure.

Figure 3:
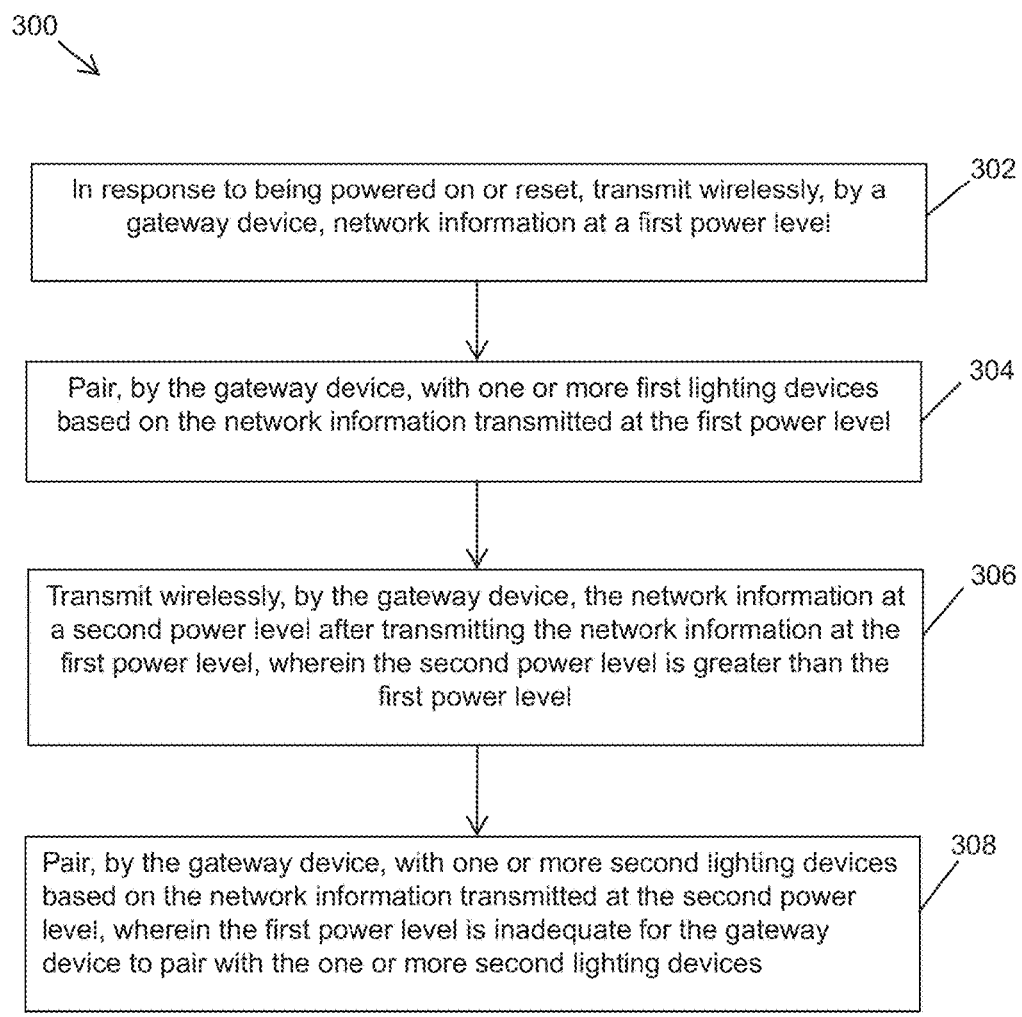
FIG. 3 illustrates a method of establishing wireless communications based on the system of FIGS. 1 and 2 according to an example embodiment.

FIG. 3 illustrates a method 300 of establishing wireless communications based on the system of FIGS. 1 and 2 according to an example embodiment. Referring to FIGS. 1-3, at step 302, the method 300 includes, in response to being powered on or reset, transmitting wirelessly, by a gateway device (e.g., the gateway device 102), network information (e.g., outgoing wireless signals 230 carrying the network information) at a first power level. At step 304, the method 300 includes pairing, by the gateway device, with one or more first wireless nodes (e.g., wireless nodes D1-D3 or wireless nodes 202-208) based on the network information (e.g., outgoing wireless signals 230 carrying the network information) transmitted at the first power level. At step 306, the method 300 includes transmitting, by the gateway device, the network information (e.g., outgoing wireless signals 230 carrying the network information) at a second power level after transmitting the network information at the first power level. The second power level is greater than the first power level (e.g., 20% of maximum power). For example, the second power level may be at 60% of the maximum power at which that the gateway device 102 can transmit the outgoing wireless signals 230. As another example, the second power level may be at 100% of the maximum power at which that the gateway device 102 can transmit the outgoing wireless signals 230. At step 308, the method 300 includes pairing, by the gateway device, with one or more second wireless nodes (e.g., wireless nodes D4-D6 or wireless nodes 210-212) based on the outgoing wireless signal (i.e., based on the network information carried by the outgoing wireless signal) transmitted at the second power level. The first power level is inadequate for the gateway device to pair with the one or more second wireless nodes.

The method 300 may also include transmitting, by the gateway device 102, the network information (e.g., the outgoing wireless signals 230 carrying the network information) at a third power level after transmitting network information (e.g., the outgoing wireless signals 230 carrying the network information) at the second power level, where the third power level is greater than the second power level. The method 300 may also include setting the first power level and the second power level based on a first number of wireless nodes that are located within a first distance from the gateway device 102 and based on a second number of wireless nodes that are located farther than the first distance from the gateway device 102. The gateway device 102 automatically (i.e., without a user input) changes from transmitting the network information at the first power level to transmitting the network information at the second power level.

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:

1. A gateway device of a wireless lighting system, the gateway device comprising a transmitter configured to:
   transmit network information wirelessly at a first power level;
   pair with one or more wireless nodes based on the network information transmitted by the gateway device at the first power level; and
   transmit the network information wirelessly at a second power level after transmitting the network information wirelessly at the first power level, wherein the second power level is greater than the first power level, wherein the transmitter is configured to transmit the network information wirelessly at the first power level at least until the gateway device detects no attempt by a wireless node to pair with the gateway device during a time duration based on the network information transmitted at the first power level, and wherein the transmitter transmits the network information wirelessly at the second power level for a second time duration that depends on a number of wireless nodes that successfully pair with the gateway device based on the network information transmitted by the transmitter at the second power level.

2. The gateway device of claim 1, wherein the transmitter transmits the network information wirelessly at the first power level for the time duration, wherein the time duration depends on a number of wireless nodes that pair with the gateway device based on the network information transmitted by the transmitter at the first power level.

3. The gateway device of claim 2, wherein the transmitter stops transmitting the network information wirelessly at the first power level and starts transmitting the network information at the second power level if no wireless nodes pair with the gateway device for a time period within the time duration.

4. The gateway device of claim 1, wherein the transmitter transmits the network information at a third power level after transmitting the network information at the second power level and wherein the third power level is greater than the second power level.

5. The gateway device of claim 1, further comprising a receiver to receive incoming wireless signals.

6. The gateway device of claim 5, further comprising a controller configured to process the incoming wireless signals received by the receiver and to control wireless transmissions of the network information by the transmitter.

7. The gateway device of claim 1, wherein the transmitter transmits the network information at the first power level in response to the gateway device being powered on.

8. The gateway device of claim 1, wherein the transmitter transmits the network information at the first power level in response to the gateway device being reset.

9. The gateway device of claim 1, wherein the network information includes a name associated with a wireless network that is used by the gateway device for wireless communication with wireless nodes.

10. A wireless lighting system, comprising:
a gateway device configured to wirelessly transmit network information at a first power level and to wirelessly transmit the network information at a second power level after transmitting the network information at the first power level;
a first wireless node located within a first distance from the gateway device; and
a second wireless node located at a second distance from the gateway device that is longer than the first distance, wherein the first wireless node pairs with the gateway device based on the network information transmitted at the first power level, wherein the second wireless node pairs with the gateway device based on the network information transmitted at the second power level after the first wireless node pairs with the gateway device based on the network information transmitted by the gateway device at the first power level, wherein the second wireless node is unable to pair with the gateway device based on the network information transmitted at the first power level, and wherein the gateway device is configured to transmit the network information wirelessly at the first power level at least until the gateway device detects during a time duration no attempts by one or more wireless nodes to pair with the gateway device based on the network information transmitted at the first power level.

11. The wireless lighting system of claim 10, wherein the gateway device transmits the network information at the first power level in response to the gateway device being powered on.

12. The wireless lighting system of claim 10, wherein the gateway device transmits the network information at the first power level in response to the gateway device being reset.

13. The wireless lighting system of claim 10, wherein the gateway device transmits the network information wirelessly at the first power level for the time duration, wherein the time duration depends on a number of wireless nodes that pair with the gateway device based on the network information transmitted by the transmitter at the first power level.

14. The wireless lighting system of claim 13, wherein the transmitter stops transmitting the network information wirelessly at the first power level and starts transmitting the network information at the second power level if no wireless nodes pair with the gateway device for a time period within the time duration.

15. The wireless lighting system of claim 10, further comprising a third wireless node located at a third distance from the gateway device, wherein the third distance is longer than the second distance, wherein the third wireless node is unable to pair with the gateway device based on the network information transmitted at the first power level and based on the network information transmitted at the second power level, and wherein the third wireless node pairs with the gateway device based on the network information transmitted at the third power level.

16. A method of establishing wireless communications between a gateway device and wireless nodes of a wireless lighting system, the method comprising:
transmitting wirelessly, by a gateway device, network information at a first power level;
pairing, by the gateway device, with one or more first wireless nodes based on the network information transmitted at the first power level, wherein the gateway device transmits the network information wirelessly at the first power level at least until the gateway device detects during a time duration no attempt by a wireless node to pair with the gateway device based on the network information transmitted at the first power level;
transmitting wirelessly, by the gateway device, the network information at a second power level after transmitting the network information at the first power level and after pairing with the one or more first wireless nodes based on the network information transmitted by the gateway device at the first power level, wherein the second power level is greater than the first power level; and
pairing, by the gateway device, with one or more second wireless nodes based on the network information transmitted at the second power level, wherein the first power level is inadequate for the gateway device to pair with the one or more second wireless nodes.

17. The method of claim 16, further comprising transmitting, by the gateway device, the network information at a third power level after transmitting the network information at the second power level, wherein the third power level is greater than the second power level.

18. The method of claim 16, further comprising setting the first power level and the second power level based on a first number of wireless nodes that are located within a first distance from the gateway device and based on a second number of wireless nodes that are located farther than the first distance from the gateway device.

19. The method of claim 16, wherein the gateway device transmits the network information at the first power level in response to being powered on or reset and wherein the gateway device automatically changes from transmitting the network information at the first power level to transmitting the network information at the second power level.

* * * * *